United States Patent
Arnold et al.

(10) Patent No.: US 9,523,453 B2
(45) Date of Patent: Dec. 20, 2016

(54) LOCKING QUICK CONNECT ASSEMBLY

(71) Applicant: Miniature Precision Components, Inc., Walworth, WI (US)

(72) Inventors: Kathleen B. Arnold, Belvidere, IL (US); Chad M. Dickman, Poplar Grove, IL (US)

(73) Assignee: MINIATURE PRECISION COMPONENTS, INC., Walworth, WI (US)

( * ) Notice: Subject to any disclaimer, the term of this patent is extended or adjusted under 35 U.S.C. 154(b) by 819 days.

(21) Appl. No.: 13/847,731

(22) Filed: Mar. 20, 2013

(65) Prior Publication Data

US 2014/0284915 A1  Sep. 25, 2014

(51) Int. Cl.
*F16L 37/098* (2006.01)

(52) U.S. Cl.
CPC .................... *F16L 37/0985* (2013.01)

(58) Field of Classification Search
CPC .... F16L 37/0985; F16L 37/0982; F16L 33/32; F16L 33/24
See application file for complete search history.

(56) References Cited

U.S. PATENT DOCUMENTS

| | | |
|---|---|---|
| 4,366,945 A | 1/1983 | Blauenstein |
| 4,664,427 A | 5/1987 | Johnston |
| 4,802,696 A | 2/1989 | Chohan et al. |
| 4,871,195 A | 10/1989 | Parrish |
| 4,966,398 A | 10/1990 | Peterson |
| 5,069,424 A | 12/1991 | Dennany, Jr. et al. |
| 5,401,063 A | 3/1995 | Plosz |
| 5,542,716 A | 8/1996 | Szabo et al. |
| 5,568,024 A | 10/1996 | Suzuki |
| 5,607,190 A | 3/1997 | Exandier |
| 5,649,724 A | 7/1997 | Wiethorn |
| 5,711,549 A | 1/1998 | Beans |

(Continued)

FOREIGN PATENT DOCUMENTS

DE       102012106925 A1 *  6/2014   .......... F16L 37/0982

OTHER PUBLICATIONS

International Search Report mailed Jun. 23, 2014 (PCT/US2014/013988).

*Primary Examiner* — Daniel P Stodola
*Assistant Examiner* — Zachary Dragicevich
(74) *Attorney, Agent, or Firm* — Dickinson Wright PLLC

(57) ABSTRACT

A locking quick connect assembly is provided for removably coupling a first tube and a second tube. A quick connect housing presents a central bore for receiving the second tube. A redundant latch component positionable between an unlocked position and a locked position may be provided to slidingly engage the quick connect housing. A twist lock retainer surrounds the quick connect housing and the redundant latch component. The redundant latch component includes an axially extending redundant latch retaining arm and the twist lock retainer includes a locking channel for receiving the redundant latch retaining arm. The twist lock retainer also includes a twist lock retaining arm that locks against a bead of the second tube to resists separation. The twist lock retaining arm extends perpendicularly to and radially inwardly of the locking channel to interleavingly engage the redundant latch retaining arm thus preventing unwanted decoupling of the assembly.

35 Claims, 6 Drawing Sheets

(56) References Cited

U.S. PATENT DOCUMENTS

| | | |
|---|---|---|
| 5,725,258 A | 3/1998 | Kujawski |
| 5,863,077 A | 1/1999 | Szabo et al. |
| 5,890,749 A | 4/1999 | Fukaya |
| 6,131,961 A | 10/2000 | Hellmann |
| 6,173,998 B1 * | 1/2001 | Bock .................. F16L 37/0985 285/319 |
| 6,199,920 B1 * | 3/2001 | Neustadtl ............ F16L 25/0045 285/319 |
| 6,328,344 B1 * | 12/2001 | Tozaki ................ F16L 37/0985 285/120.1 |
| 7,484,774 B2 | 2/2009 | Kerin et al. |
| 7,566,079 B1 | 7/2009 | Callahan et al. |
| 8,632,052 B2 * | 1/2014 | Liu ........................ F16L 37/40 251/149.6 |
| 2007/0120362 A1 | 5/2007 | Poder |
| 2012/0119485 A1 * | 5/2012 | Cichorek ............ F16L 37/0985 285/81 |
| 2012/0319401 A1 * | 12/2012 | Wang .................... F16L 37/133 285/363 |
| 2014/0265316 A1 | 9/2014 | Mullin |

* cited by examiner

LOCKING QUICK CONNECT ASSEMBLY

BACKGROUND OF THE INVENTION

1. Field of the Invention

The present invention relates to locking quick connect assemblies for removably coupling a first tube and a second tube and more particularly to automotive style locking quick connect assemblies which may include a redundant lock.

2. Description of the Prior Art

Locking quick connect assemblies are well known in the art for removably coupling a first tube and a second tube. Locking quick connect assemblies are widely utilized in the automotive industry to removably couple the fluid lines of an automobile such as the fuel lines, brake lines, oil lines, water lines, hydraulic lines, air lines, and the like. Automobiles are typically assembled on moving assembly lines where subassemblies are installed at various locations along the line. Accordingly, locking quick connect assemblies are advantageous because they allow assembly line workers to quickly and easily connect fluid lines leading to and away from the various subassemblies as the automobile travels along the assembly line. Additionally, since locking quick connect assemblies may be decoupled at a later time, service and repair of the automobile can be accomplished more easily because components are more readily removed and replaced.

The locking quick connect assemblies known in the art, such as the one disclosed in U.S. Pat. No. 5,542,716 to Szabo et al., entitled "Quick Connector with Snap-on Retainer," generally include a quick connect housing having a male retention segment for engagement with the first tube and a female segment for receiving the second tube. It should be appreciated that in the automotive industry, the second tube is often referred to as an SAE pin and includes a bead extending annularly about the second tube. The male retention segment of the quick connect housing typically has a tubular shape for engagement with the first tube. The male retention segment may further present a plurality of annular barbs including several retention barbs being axially spaced and ramped up to a greater radial diameter to facilitate insertion of the male retention segment into the first tube and to resist subsequent separation between the first tube and the male retention segment. The female segment of the quick connect housing typically extends axially away from the male retention segment and has an interior surface defining a central bore for receiving the second tube. The interior surface of the female segment may include stepped portions for engaging the bead of the second tube and for receiving seals that engage the interior surface of the female segment and the second tube.

As is known in the art, a redundant lock mechanism may be desirable in certain applications to ensure that the locking quick connect assembly does not decouple unintentionally. The redundant lock mechanism typically takes the form of a clip that is inserted into an opening in the female segment of the quick connect housing. As it is inserted, the clip engages the bead of the second tube to prevent separation of the second tube and the quick connect housing. Often, this redundant lock mechanism or clip is a physically separate part that is not attached to the quick connect housing. Thus, several problems arise. The separate clip may be lost before installation occurs or when the locking quick connect assembly is decoupled during service or repair operations. The separate clip may also be difficult to insert into the opening in the quick connect housing in blind installation situations where the quick connect assembly may be felt but not seen.

To address these problems, locking quick connect assemblies have been developed, such as the one disclosed in U.S. Pat. No. 5,649,724 to Wiethorn, entitled "Secondary Latch and Indicator for Fluid Coupling," where the clip is attached to the quick connect housing by a hinge. These locking quick connect assemblies however still suffer from several problems. The hinged clip tends to break off either before installation occurs or when the locking quick connect assembly is decoupled during service or repair operations. Also, regardless of whether the clip is attached to the quick connect housing or is a separate part, such clips tend to be difficult to remove once installed and may even require tools for removal. This can be especially problematic in blind installation situations where use of tools is difficult or where there is little room to manipulate the locking quick connect assembly. What is needed is a locking quick connect assembly that is more durable, does not contain a loose clip component, and can be more easily decoupled.

The Applicant has appreciated that a twist lock mechanism would meet these needs. However, it was found that the twist lock mechanisms known in the art could not be easily adapted to this style of quick connect assembly. The twist lock mechanisms known in the art, such as the one disclosed in U.S. Pat. No. 7,566,079 to Callahan et al., entitled "Duct Coupling," serve to removably couple a pair of ducts in an end-butting arrangement. However, the twist lock mechanism disclosed is not configured to receive a second tube, such as an SAE pin, and lock against the bead of the second tube to prevent separation between the second tube and the quick connect housing. Accordingly, known twist lock mechanisms do not function to lock in a single motion wherein the second tube is laterally advanced with respect to the quick connect housing. Moreover, prior art twist lock mechanisms can be prone to undesired decoupling where the twist lock mechanism experiences unwanted rotation to its unlocked position. Accordingly, what is needed is a clipless locking quick connect assembly that is durable, has a simple locking motion, unlocks easily and without tools, and which may include a redundant lock that prevents unwanted unlocking of the twist lock mechanism.

SUMMARY OF THE INVENTION

According to one aspect of the invention, a locking quick connect assembly is provided for removably coupling a first tube and a second tube. The locking quick connect assembly includes a quick connect housing having a male retention segment for engagement with the first tube and a female segment for receiving the second tube. The female segment extends axially from the male retention segment and presents a central bore for receiving the second tube. The female segment also includes a twist lock retainer arm window. The locking quick connect assembly may further include a redundant latch component positionable between an unlocked position and a locked position with the redundant latch component being in sliding engagement with the female segment. A twist lock retainer is disposed radially outwardly of and surrounds at least a portion of the female segment and at least a portion of the redundant latch component. The redundant latch component includes a redundant latch retaining arm extending axially with respect to the female segment and the twist lock retainer includes a locking channel for receiving the redundant latch retaining arm.

The twist lock retainer also includes a twist lock retaining arm arranged perpendicularly to the locking channel. The twist lock retaining arm extends radially inwardly of the locking channel to engage the twist lock retainer arm window of the female segment. The twist lock retaining arm also provides interleaving engagement with the redundant latch retaining arm as the redundant latch retaining arm is received in the locking channel and the redundant latch component is advanced to the locked position. Accordingly, this configuration is advantageous over prior art quick connect assemblies because unwanted release of the twist lock retaining arm from the twist lock retaining window is prevented by the interleaving engagement of the redundant latch retaining arm.

According to another aspect of the invention, the female segment of the locking quick connect assembly has a proximal end adjacent the male retention segment and a distal end opposite the proximal end. The twist lock retaining arm includes an inside face being ramped up in an axial direction to a greater radial thickness toward the proximal end of the female segment to facilitate insertion of the second tube into the central bore of the female segment. Additionally, the inside face of the twist lock retaining arm locks against the bead of the second tube and resists subsequent separation between the second tube and the quick connect housing.

Advantageously, this allows the locking quick connect assembly to be installed in one simple motion. That is, the locking quick connect assembly removably couples the second tube and the quick connect housing by simply advancing the second tube into the central bore of the quick connect housing until the bead of the second tube passes the twist lock retaining arm and the redundant latch component is advanced into the locked position. This operation only requires simple lateral movement between the second tube and the quick connect housing where the second tube and the quick connect housing are pushed towards one another.

Another added benefit is that two audible and/or tactile clicks occur during the installation process providing an indication that the locking quick connect assembly has been properly installed. These clicks occur sequentially with the first click occurring when the twist lock retaining arm snaps over the bead of the second tube and the second click occurring when the redundant latch component is advanced all the way into its locked position. Unlocking or decoupling the quick connect assembly is equally simple and tool free. To unlock, the redundant latch component is pulled laterally to its unlocked position and the twist lock retainer is rotated or twisted to release the twist lock retaining arm. Accordingly, the locking quick connect assembly of the present invention is particularly well suit for blind installation situations and it should be appreciated that a separate clip component is eliminated.

According to yet another aspect of the invention, the locking quick connect assembly may be optionally provided without the redundant latch component. The locking quick connect assembly thus includes a quick connect housing having a male retention segment for engagement with a first tube and a female segment for receiving a second tube. The female segment extends axially from the male retention segment and has a proximal end adjacent the male retention segment and a distal end opposite the proximal end. The female segment also presents a central bore for receiving the second tube. A twist lock retainer is disposed radially outwardly of and surrounds at least a portion of the female segment and the female segment additionally includes a twist lock retainer arm window extending entirely through the female segment. The twist lock retainer includes at least one twist lock retaining arm extending circumferentially about a portion of the twist lock retainer. At the same time, the twist lock retainer arm extends radially inwardly with respect to the twist lock retainer to engage the twist lock retainer arm window of the female segment. The twist lock retaining arm includes an inside face being ramped up in an axial direction to a greater radial thickness toward the proximal end of the female segment to facilitate insertion of the second tube into the central cavity of the female segment. The twist lock retaining arm also locks against a bead of the second tube to resist subsequent separation between the second tube and the quick connect housing.

Advantageously, the locking quick connect assembly of the present invention addresses the above noted problems with known quick connect assemblies. The locking quick connect assembly disclosed also provides customers with a choice between a locking quick connect assembly that includes a redundant lock and one that does not. Depending on the application and intended use, a redundant locking quick connect assembly may not be necessary and it may be advantageous to employ a locking quick connector assembly having the flexibility of reduced cost and complexity

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a locking quick connect assembly 20 for removably coupling a first tube 22 and a second tube 24 is disclosed.

In a variety of different applications, it is desirable to removably couple a first tube 22 to a second tube 24 such that fluid may be communicated through the connector assembly. Without intending to be limited to a specific application, an exemplary application is in the automotive industry where a quick connect assembly 20 is desirable to facilitate automobile assembly and repair operations. In this application, the first tube 22 and second tube 24 are often made of an extruded plastic material and are used to communicate fluids associated with the operation of an automobile. The second tube 24, sometimes referred to as an SAE pin, typically includes a bead 26 that extends annularly about the second tube 24.

Figure 1:
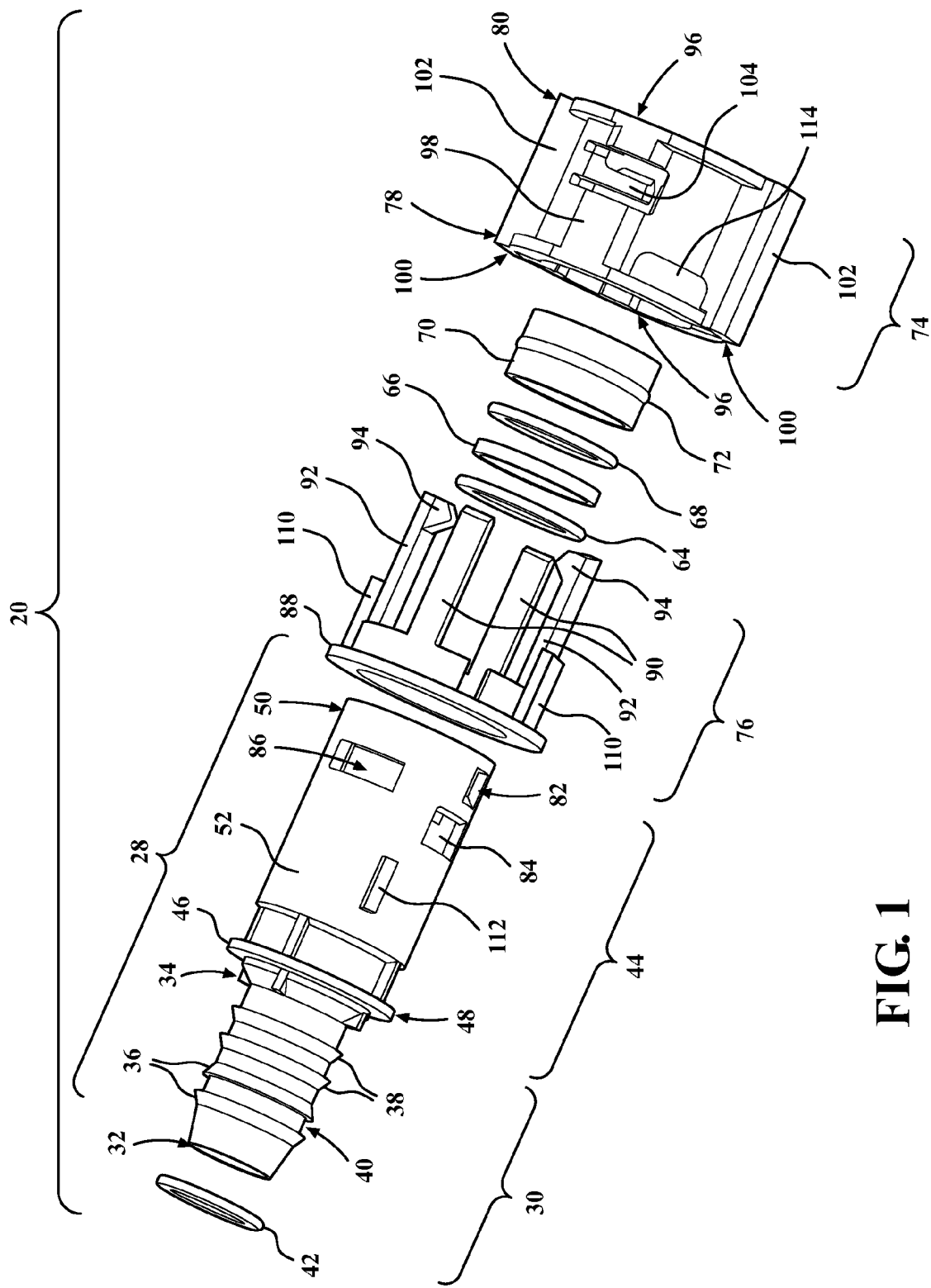
FIG. 1 is an exploded elevational view of an exemplary locking quick connect assembly of the present invention illustrated complete with a redundant latch component.
Figure 2:
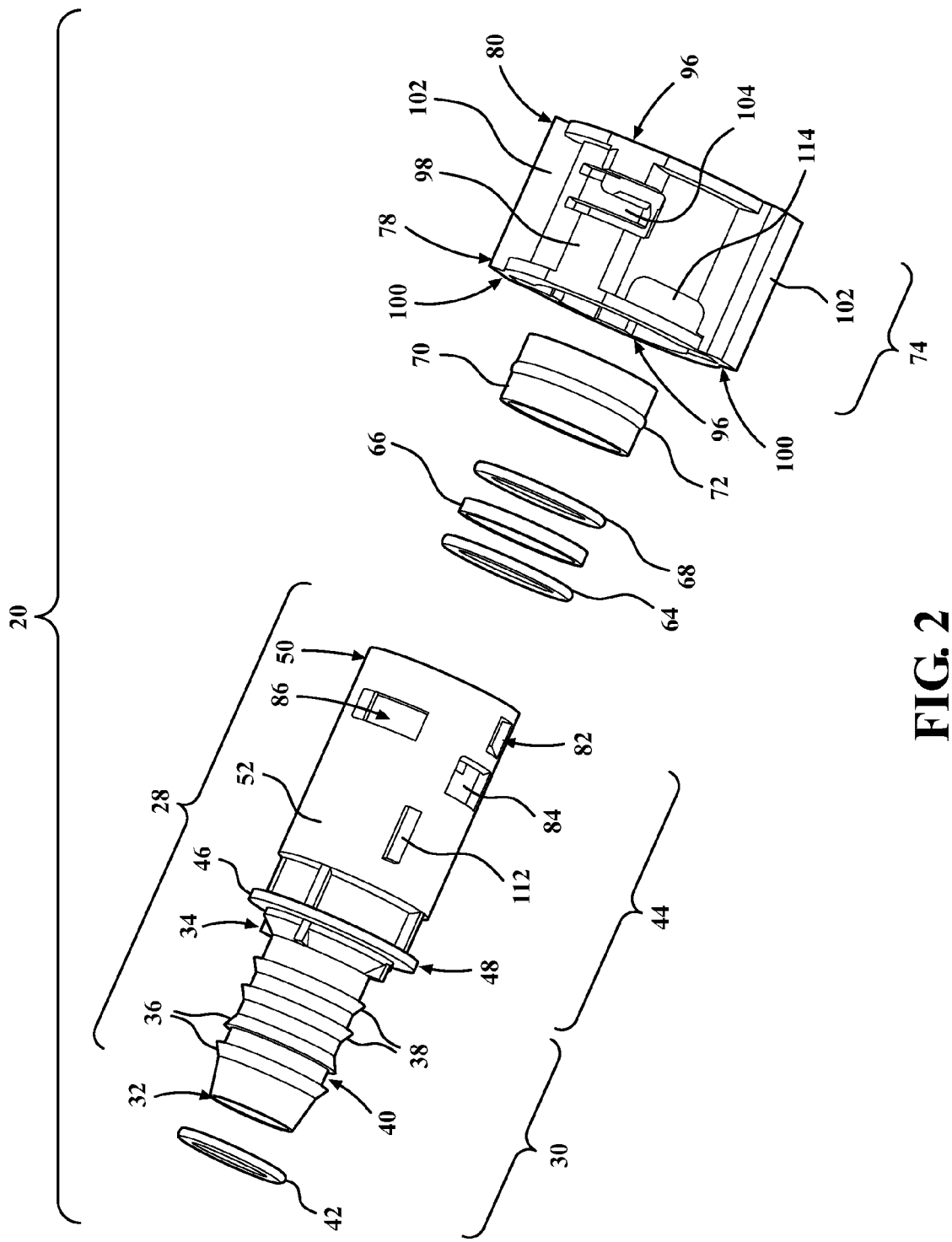
FIG. 2 is an exploded elevational view of an exemplary locking quick connect assembly of the present invention illustrated without a redundant latch component.

Referring to FIGS. 1 and 2, the quick connect assembly 20 disclosed includes a quick connect housing 28. While the quick connect housing 28 may be made from a variety of different materials, one such material may be an injection molded polymer. The quick connect housing 28 presents a male retention segment 30 of tubular shape for engagement with the first tube 22. Specifically, the male retention segment 30 has a distal end 32 for insertion into the first tube 22 and a proximal end 34 opposite the distal end 32. The male retention segment 30 of the quick connect housing 28 also includes a plurality of annular barbs 36, 38 extending radially about the male retention segment 30 for providing engagement of the first tube 22. The plurality of annular barbs 36, 38 includes a pair of sealing barbs 36 proximate to the distal end 32 of the male retention segment 30 and a pair of retention barbs 38 disposed between the proximal end 34 of the male retention segment 30 and the pair of sealing barbs 36.

The pair of sealing barbs 36 are axially spaced from one another and ramped in opposite directions to present a seal channel 40 therebetween. Accordingly, each sealing barb 36 of the pair of sealing barbs 36 has a greatest radial diameter immediately adjacent the seal channel 40. A barb seal 42 is disposed in the seal channel 40 of the male engagement segment to provide sealing engagement as the first tube 22 is pressed over the male engagement segment of the quick connect assembly 20. The barb seal 42 may be, but is not limited to, an elastomeric o-ring.

The pair retention barbs 38 are axially spaced from one another. Each retention barb 38 of the pair retention barbs 38 is ramped up to a greater radial diameter proximate, or closer, to the proximal end 34 of the male retention segment 30 to facilitate insertion of the male retention segment 30 into the first tube 22 and to resist subsequent separation between the first tube 22 and the male retention segment 30 of the quick connect housing 28. In other words, the pair of retention barbs 38 are ramped up in the direction the male retention segment 30 of the quick connect housing 28 is inserted into the first tube 22.

The quick connect housing 28 also includes a female segment 44 that extends axially away from the male retention segment 30. Accordingly, the male retention segment 30 and the female segment 44 of the quick connect housing 28 are co-axially aligned. A flange 46 located between the male retention segment 30 and the female segment extends annularly about 50 the quick connect housing 28. The female segment 44 of the quick connect housing 28 includes a proximal end 48 adjacent the flange 46 and a distal end 50 opposite the flange 46. The female segment 44 has a tubular shape with an exterior surface 52 and an interior surface 54 opposite the exterior surface 52.

Figure 4:
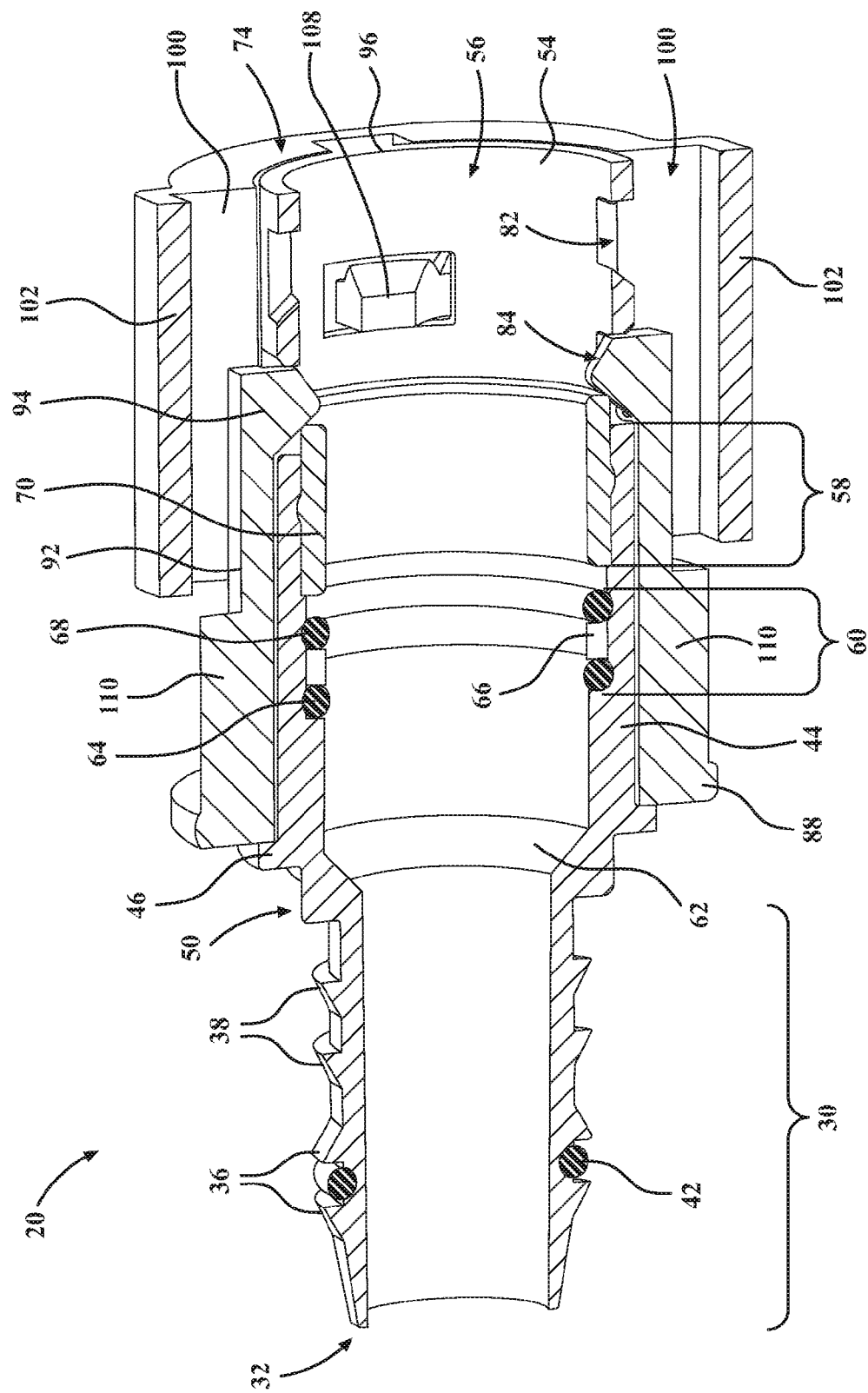
FIG. 4 is a cross-sectional elevational view of an exemplary locking quick connect assembly of the present invention illustrated in an unlocked position.
Figure 6:
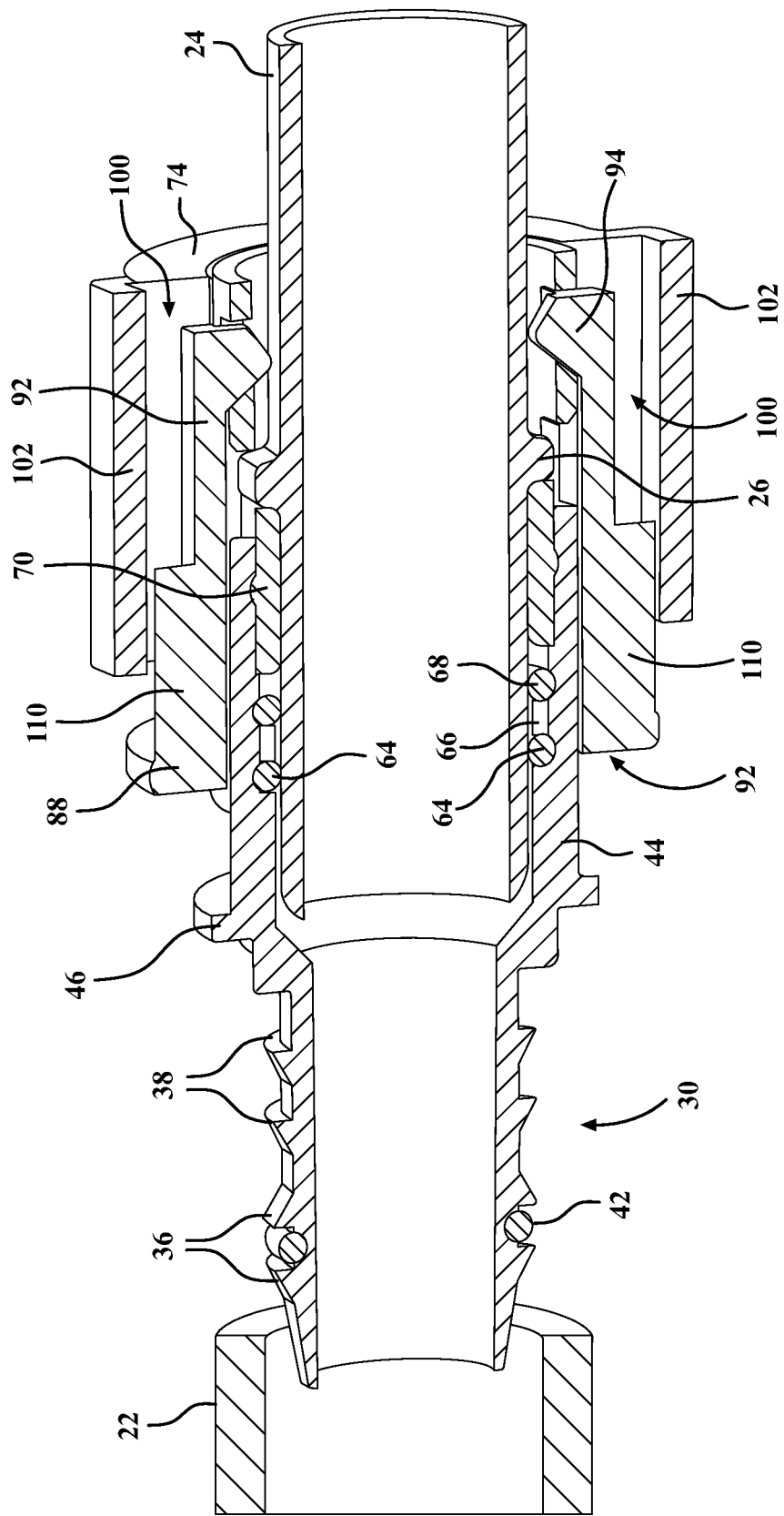
FIG. 6 is a cross-sectional elevational view of an exemplary locking quick connect assembly of the present invention illustrated in a locked position.

Referring to FIGS. 4 and 6, the interior surface 54 of the female segment 44 defines a central bore 56 for receiving the second tube 24. More specifically, the interior surface 54 of the female segment 44 includes a first step portion 58 adjacent the distal end 50 of the female segment 44 and a second step portion 60 adjacent the first step portion 58 and closer to the proximal end 48 of the female segment 44. The first step portion 58 has a predetermined diameter and the second step portion 60 has a smaller diameter than the predetermined diameter of the first step portion 58. The interior surface 54 of the female segment 44 also includes a transition portion 62 adjacent the proximal end 48 of the female segment 44 where the female segment 44 transitions to the male retention segment 30. In other words, moving from the distal end 50 of the female segment 44 to the proximal end 48 of the female segment 44, the larger diameter first step portion 58 gives way to the smaller diameter second step portion 60 which gives way to the transition portion 62.

An inner seal 64 is disposed in the second step portion 60 of the central bore 56 proximate to the proximal end 48 of the female segment 44 to provide sealing engagement as the second tube 24 is received in the central bore 56. An inner seal spacer 66 is disposed in the second step portion 60 of the central bore 56 adjacent the inner seal 64 and closer to the distal end 50 of the female segment 44 than the inner seal 64. While the inner seal spacer 66 can be made of a variety of materials, one such material may be an injection molded polymer. An outer seal 68 is also disposed in the second step portion 60 of the central bore 56 adjacent the seal spacer and closer to the distal end 48 of the female segment 44 than the inner seal spacer 66 to provide sealing engagement when the second tube 24 is received in the central bore 56. While the inner seal 64 and the outer seal 68 may be made of a variety of different materials and take many forms, the inner seal 64 and the outer seal 68 may be an o-ring made of an elastomeric material. Accordingly, the inner seal spacer 66 is sandwiched in the second step between the inner seal 64 and the outer seal 68 with the inner seal 64 being closer to the proximal end 48 of the female segment 44 and the outer seal 68 being closer to the distal end 50 of the female segment 44.

An outer seal spacer 70 is disposed in the first step portion 58 of the central bore 56 to abut the outer seal 68. The outer seal spacer 70 includes an annular bead 72 protruding radially outwardly for engagement with the interior surface 54 of the female segment 44 of the quick connect housing 28. As the second tube 24 is received in the central bore 56 of the female segment 44, the bead 26 of the second tube 24 impacts the outer seal spacer 70. Accordingly, the outer seal spacer 70 acts as a stop that prevent over insertion of the second tube 24 into the central bore 56.

Figure 5:
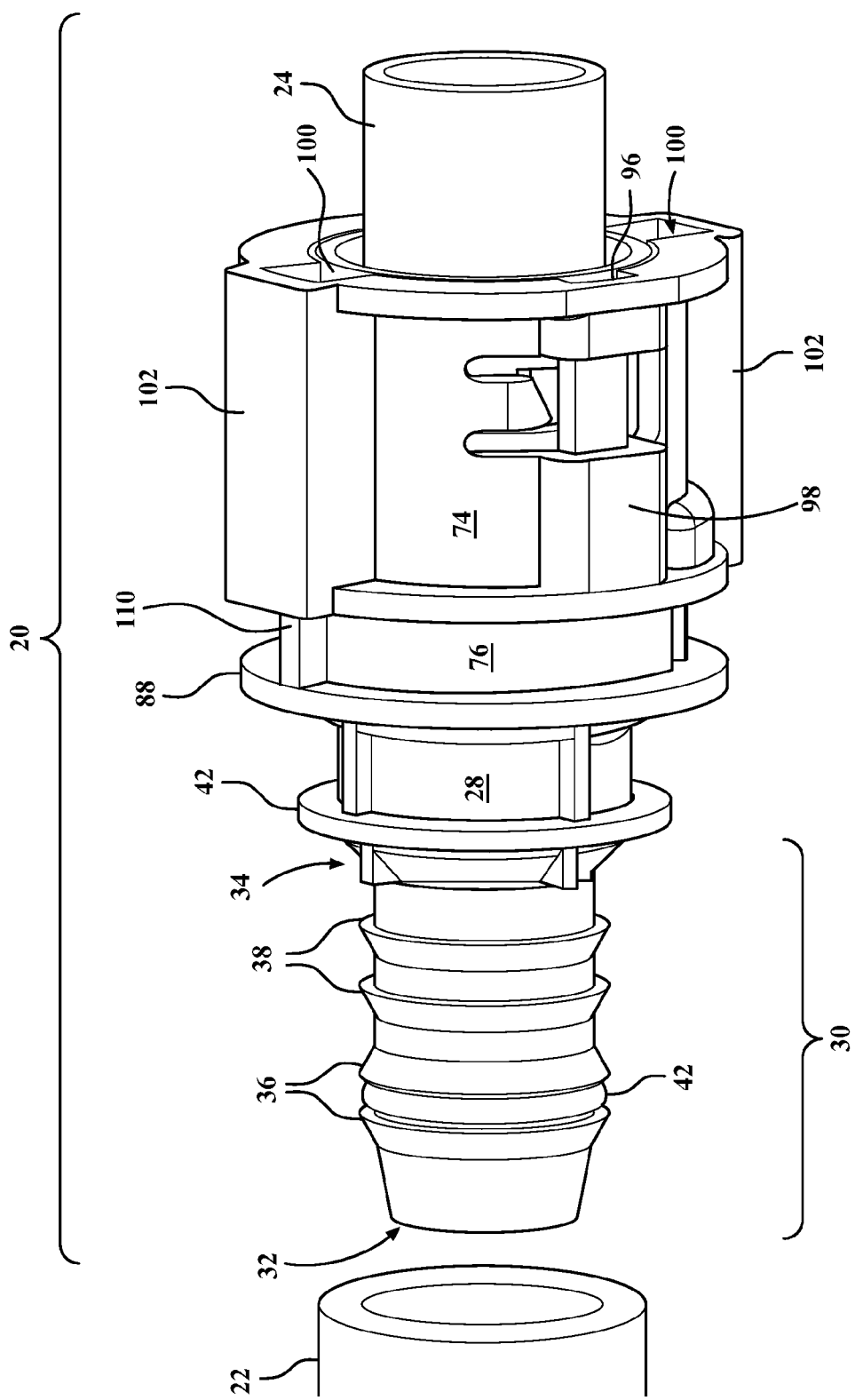
FIG. 5 is a perspective elevational view of an exemplary locking quick connect assembly of the present invention illustrated in a locked position.

Referring now to FIGS. 5 and 6, the quick connector assembly further includes a twist lock retainer 74 and optionally a redundant latch component 76. Generally, the twist lock retainer 74 functions to lock the second tube 24 within the central bore 56 of the female segment 44 of the quick connect housing 28. This prevents separation of the second tube 24 from quick connect housing 28 and ultimately the first tube 22. In certain applications, the twist lock retainer 74 is all that is required to lock the second tube 24 within the central bore 56. This configuration is shown in FIG. 2. In other applications, a redundant locking function may be desirable to ensure the coupling of the second tube 24 and the quick connect assembly 20. This configuration is shown in FIG. 1. In these later applications, the redundant latch component 76 is positionable between an unlocked position and a locked position to provide a secondary or redundant locking function. While the twist lock retainer 74 and the redundant latch component 76 may be made of a variety of different materials, one such material may be an injection molded polymer.

Figure 3:
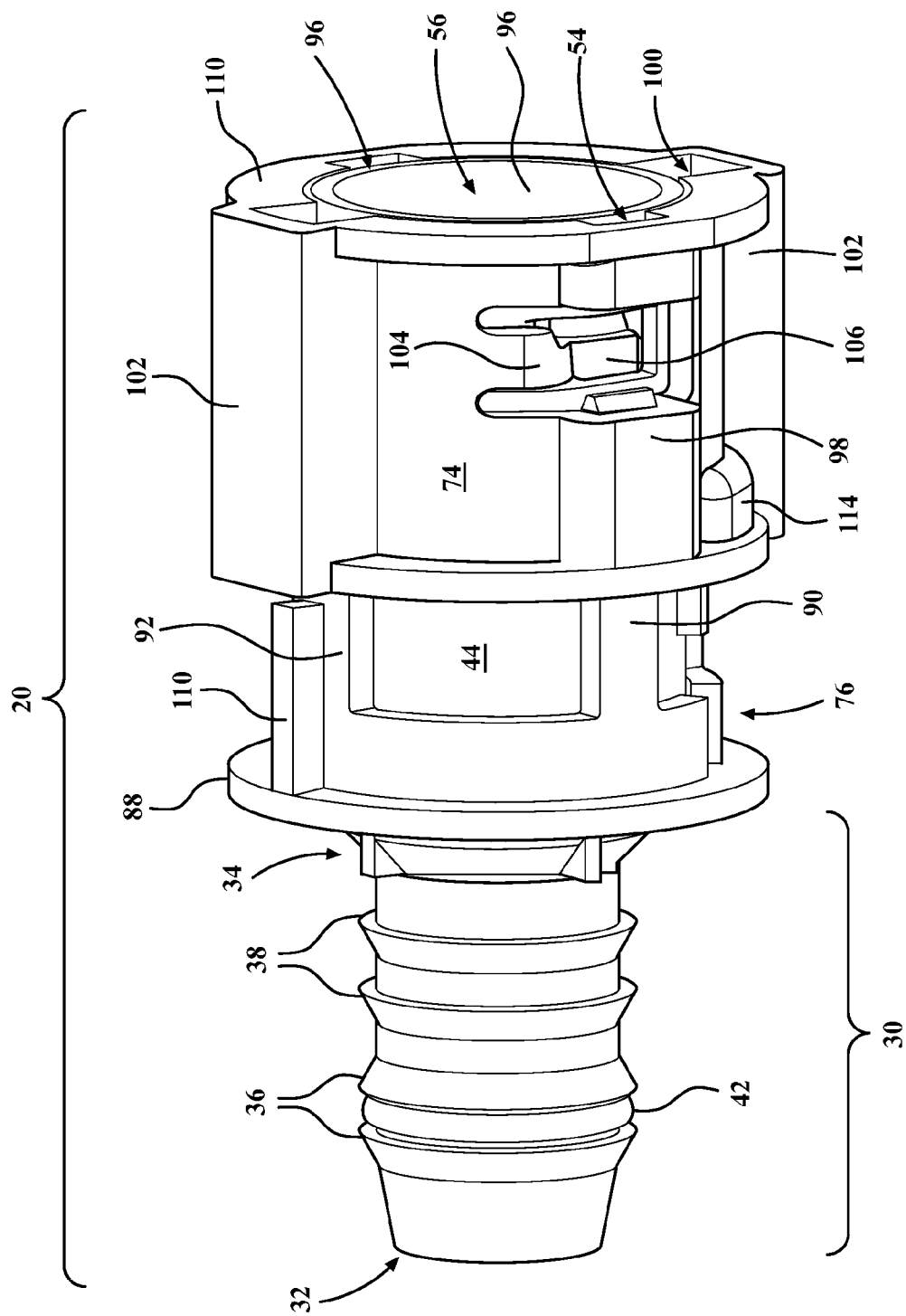
FIG. 3 is a perspective elevational view of an exemplary locking quick connect assembly of the present invention illustrated in an unlocked position.

Referring to FIGS. 3 and 5, the twist lock retainer 74 of the disclosed quick connect assembly 20 is disposed radially outwardly of and surrounds at least a portion of the female segment 44 of the quick connect housing 28. Where the redundant latch component 76 is added to the quick connect assembly 20, the twist lock retainer 74 is also disposed radially outwardly of and surrounds and at least a portion of the redundant latch component 76. Further, the twist lock retainer extends axially from a proximal end 78 to a distal end 80. The distal end 80 of the twist lock retainer 74 may be axially aligned with the distal end 50 of the female segment 44 of the quick connect housing 28 such that the distal end 80 of the twist lock retainer 74 is flush with the distal end 50 of the female segment 44 of the quick connect housing 28.

Referring now to FIGS. 1, 4, and 6, the female segment 44 of the quick connect housing 28 includes at least a first redundant latch retainer arm window 82 which may be a first pair of radially opposed redundant latch retainer arm windows 82. The first pair of redundant latch retainer arm windows 82 may extend entirely through the female segment 44 from the exterior surface 52 to the interior surface 54 with the first pair of redundant latch retainer arm windows 82 being proximate to the distal end 32 of the female segment 44. The female segment 44 of the quick connect housing 28 also includes at least a second redundant latch retainer arm window 84 which may be a second pair of radially opposed redundant latch retainer arm windows 84. The second pair of redundant latch retainer arm windows 84 may extend entirely through the female segment 44 from the exterior surface 52 to the interior surface 54. The second pair of redundant latch retainer arm windows 84 are axially spaced between the proximal end 34 of the female segment 44 and the first pair of redundant latch retainer arm windows 82. Additionally, at least part of the second redundant latch retainer arm windows 84 are axially aligned with the first redundant latch retainer arm windows 82.

The female segment 44 of the quick connect housing 28 also includes at least one twist lock retainer arm window 86 which may be a pair of radially opposed twist lock retainer arm windows 86. The pair of twist lock retainer arm windows 86 extend entirely through the female segment 44 from the exterior surface 52 to the interior surface 54 and may be circumferentially spaced from the first pair of redundant retainer lock windows 82 and the second pair of redundant retainer lock windows 84.

The redundant latch component 76 of the quick connect assembly 20 includes an annular collar 88 in sliding engagement with the exterior surface 52 of the female segment 44 of the quick connect housing 28. The redundant latch component 76 also includes at least a first redundant latch retaining arm which may be a first pair of redundant latch retaining arms 90 being radially opposed and extending axially from the annular collar 88. The redundant latch component 76 may further include at least one second redundant latch retaining arm which may be a second pair of redundant latch retaining arms 92 being radially opposed and extending axially from the annular collar 88. When present, the second pair of redundant latch retaining arms 92 may be circumferentially spaced from the first pair of redundant latch retaining arms 90.

The second pair of redundant latch retaining arms 92 may have inwardly ramped ends 94 for sequential engagement with the second pair of redundant latch retainer arm windows 84 and the first pair of redundant latch retainer arm windows 82. As shown in FIGS. 3 and 4, the unlocked position of the redundant latch component 76 may be defined where the inwardly ramped ends 94 of the second pair of redundant latch retaining arms 92 are engaged in the second pair of redundant latch retainer arm windows 84. As shown in FIGS. 5 and 6, the locked position of the redundant latch component 76 may be defined where the inwardly ramped ends 94 of the second pair of redundant latch retaining arms 92 are engaged in the first pair of redundant latch retainer arm windows 82. It should also be appreciated that in the unlocked position, the annular collar 88 of the redundant latch component 76 contacts the flange 46 of the quick connect housing 28. Then, as the second tube 24 is received in the central bore 56 and the annular collar 88 of the redundant latch component 76 is slid toward the distal end 32 of the female segment 44, the redundant latch component 76 is advanced to the locked position.

Referring to FIGS. 1 and 2, the twist lock retainer 74 of the quick connect assembly 20 includes at least one locking channel which may be a pair of radially opposed locking channels 96 for receiving the first pair of redundant latch retaining arms 90. The pair of locking channels 96 may be defined by locking channel pockets 98 protruding radially outwardly from the twist lock retainer 74. Both the pair of locking channels 96 and the respective locking channel pockets 98 may extend from the proximal end 80 of the twist lock retainer 74 to the distal end 78 of the twist lock retainer 74. The twist lock retainer 74 may also include at least one guide channel which may be a pair of radially opposed guide channels 100 for receiving the second pair of redundant latch retaining arms 92. The pair of guide channels 100 may be defined by guide channel pockets 102 protruding radially outwardly from the twist lock retainer 74. Both the pair of guide channels 100 and the respective guide channel pockets 102 may extend from the proximal end 78 of the twist lock retainer 74 to the distal end 80 of the twist lock retainer 74.

The twist lock retainer 74 further includes at least one twist lock retaining arm 104 which may be a pair of twist lock retaining arms 104. The pair of twist lock retaining arms 104 may be arranged perpendicularly to the pair of locking channels 96. The pair of twist lock retaining arms 104 extend radially inwardly of the pair of locking channels 96 for engagement with the pair of twist lock retainer arm windows 86 of the female segment 44 of the quick connect housing 28. The pair of twist lock retaining arms 104 include an outside face 106 and an inside face 108 opposite the outside face 106. As best seen in FIG. 5, the outside face 106 of the pair of twist lock retaining arms 104 is curved radially inwardly to interleavingly engage the first pair of redundant latch retaining arms 90 as the first pair of redundant latch retaining arms 90 are received in the pair of locking channels 96 and the redundant latch component 76 is advanced to the locked position. It should be appreciated that the interleaving engagement of the twist lock retaining arms 104 and the first pair of redundant latch retaining arms 90 provides a redundant locking feature. More particularly, the first pair of redundant latch retaining arms 90 are sandwiched between the twist lock retaining arms 104 and the locking channel pockets 98 when the redundant latch component 76 is advanced to the locked position, thereby preventing the twist lock retaining arms 104 from retracting radially outwardly and disengaging the twist lock retainer arm windows 86 of the female segment 44.

As best seen in FIG. 4, the inside face 108 of the pair of twist lock retaining arms 104 is ramped up in an axial direction to a greater radial thickness toward the proximal end 34 of the twist lock retainer 74. Accordingly, the inside surface of the pair of twist lock retaining arms 104 is ramped up in the direction the second tube 24 is inserted into the central bore 56 of the female segment 44. Accordingly, the inside face 108 of the pair of twist lock retaining arms 104 facilitates insertion of the second tube 24 into the central bore 56 of the female segment 44 of the quick connect housing 28 and resists subsequent separation between the second tube 24 and the quick connect housing 28 by locking against the bead 26 of the second tube 24.

It should be appreciated that the design of the twist lock retainer 74 and the redundant latch component 76 provide a two stage locking quick connect assembly 20. In the first stage, the second tube 24 is inserted into the central bore 56 until it hits the outer seal spacer 70. During the first stage, the bead 26 of the second tube 24 presses against the twist lock retaining arms 104 of the twist lock retainer 74 which extend into the central bore 56 through the twist lock retainer arm windows 86. The bead 26 of the second tube 24 interacts with the inside face 108 of the pair of twist lock retaining arms 104 to push the pair of twist lock retaining arms 104 radially outwardly. As the bead 26 of the second tube 24 passes the pair of twist lock retaining arms 104 during continued insertion into the central bore 56, the pair of twist lock retaining arms 104 snap back down into the central bore 56 through the twist lock retainer arm windows 86 with an audible and/or tactile click. Since the bead 26 of the second tube 24 has passed the ramped up shape of the inside face 108 of the pair of twist lock retaining arms 104, the second tube 24 is locked in place and the bead 26 of the second tube 24 cannot move backward against pair of twist lock retaining arms 104. In the second stage, the redundant latch component 76 is advanced from the unlocked position to the locked position. This advances the first pair of redundant latch retaining arms 90 into the locking channels 96 to interleavingly engage the pair of twist lock retaining arms 104. During the second stage, the inwardly ramped ends 94 of the second pair of redundant latch retaining arms 92 disengage from the second pair of redundant latch retainer arm windows 84. As the redundant latch component 76 is advanced by pushing axially on the annular collar 88, the inwardly ramped ends 94 of the second pair of redundant latch retaining arms 92 engage the first pair of redundant latch retainer arm windows 82 with an audible and/or tactile click. Advantageously, the two audible and/or tactile clicks of this two stage procedure provide an indication that the redundant quick connect assembly 20 has been properly installed. This is particularly useful in blind install situations where the user cannot see the quick connect assembly 20 during and/or after the installation procedure.

It should further be appreciated that the redundant latch component 76 cannot be advanced to the locked position until the second tube 24 is fully inserted into the central bore 56 such that the bead 26 of the second tube 24 is inserted past the at least one twist lock retaining arm 104. Once this occurs, the bead 26 of the second tube 24 applies an upward pressure on the ramped ends 94 of the redundant latch retaining arms 92 allowing the ramped ends 94 to disengage the second pair of redundant retainer lock windows 84 and advancement of redundant latch component 76 to the locked position. This is advantageous as it ensures proper installation because the redundant latch component 76 cannot be engaged unless the second tube 24 is properly received in the central bore 56 of the female segment 44.

The redundant locking quick connect assembly 20 may be unlocked in a similar two stage procedure. First, the annular collar 88 of redundant latch component 76 is pulled back from the locked position to the unlocked position where the annular collar 88 of the redundant latch component 76 hits the flange 46 of the quick connect housing 28. This disengages the inwardly ramped ends 94 of the second pair of redundant latch retaining arms 92 from the first pair of redundant latch retainer arm windows 82 and retracts the first pair of redundant latch retaining arms 90 from interleaving engagement with the pair of twist lock retainer arms 104. Second, the twist lock retainer 74 is rotated to disengage the pair of twist lock retaining arms 104 from the pair of twist lock retainer arm windows 86. This releases the bead 26 of the second tube 24 and allows the second tube 24 to be withdrawn from the central bore 56 of the female segment 44.

Referring to FIGS. 1 and 2, the redundant latch component 76 may additionally include a shoulder 110 extending axially from the annular collar 88 and protruding radially outwardly from at least one redundant latch retaining arm of the second pair of redundant latch retaining arms 92. The shoulder 110 contacts the guide channel pockets 102 of the twist lock retainer 74 and provides a space between the second pair of redundant latch retaining arms 92 and the guide channel pockets 102. This space gives the inwardly ramped ends 94 of the second pair of redundant latch retaining arms 92 room to deflect and disengage the first pair of redundant latch retainer arm windows 82 and the second pair of redundant latch retainer arm windows 84. Also, the female segment 44 of the quick connect housing 28 may further include at least one alignment tab 112 protruding outwardly from the exterior surface 52 of the female segment 44. At the same time, the twist lock retainer 74 may include an anti-rotation pocket 114 extending radially outwardly from the twist lock retainer 74 and axially from the proximal end 34 of the twist lock retainer 74. The anti-rotation pocket 114 receives the at least one alignment tab 112 restricting over rotation of the twist lock retainer 74 relative to the quick connect housing 28 by limiting rotational movement of the at least one alignment tab 112 as the twist lock retainer 74 is being rotated to release the twist lock retaining arms 104. It should be appreciated that the alignment tab 112 and the anti-rotation pocket 114 do not prevent rotation of the twist lock collar altogether but instead limit the range or extent of such rotation relative to the quick connect housing 28.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A redundant locking quick connect assembly for removably coupling a first tube and a second tube comprising;

a quick connect housing including a male retention segment for engagement with the first tube and a female segment extending axially from said male retention segment and presenting a central bore for receiving the second tube, a redundant latch component positionable between an unlocked position and a locked position with said redundant latch component being in sliding engagement with said female segment, a twist lock retainer disposed radially outwardly of and surrounding at least a portion of said female segment and at least a portion of said redundant latch component, said female segment including a twist lock retainer arm window, said redundant latch component including a redundant latch retaining arm extending axially with respect to said female segment, said twist lock retainer including a locking channel for receiving said redundant latch retaining arm, and said twist lock retainer including a twist lock retaining arm perpendicular to said locking channel and extending radially inwardly of said locking channel to engage said twist lock retainer arm window of said female segment and to provide interleaving engagement with said redundant latch retaining arm, wherein said redundant latch retaining arm is disposed radially between said twist lock retaining arm and said twist lock retainer at said channel as said redundant latch retaining arm is received in said locking channel and said redundant latch component is advanced to said locked position to prevent release of said twist lock retaining arm from said twist lock retaining window, and wherein said female segment of said quick connect housing includes at least one alignment tab protruding outwardly from said female segment and said twist lock retainer includes an anti-rotation pocket receiving said at least one alignment tab and limiting over rotation of said twist lock retainer relative to said quick connect housing by restricting rotational movement of said at least one alignment tab as said twist lock retainer is being rotated to release said twist lock retaining arm.

2. A redundant locking quick connect assembly of claim 1 wherein said female segment has a proximal end adjacent said male retention segment and a distal end opposite said proximal end and said twist lock retaining arm includes an inside face being ramped up in an axial direction to a greater radial thickness toward said proximal end of said female segment to facilitate insertion of the second tube into said central bore of said female segment and to resist subsequent separation between the second tube and said quick connect housing by locking against a bead of the second tube that extends annularly about the second tube.

3. A redundant locking quick connect assembly of claim 2 wherein said female segment of said quick connect housing includes a first redundant latch retainer arm window proximate to said distal end of said female segment.

4. A redundant locking quick connect assembly of claim 3 wherein said female segment of said quick connect housing includes a second redundant latch retainer arm window axially spaced between said first redundant latch retainer arm window and said proximal end of said female segment.

5. A redundant locking quick connect assembly of claim 4 wherein said redundant latch component includes an annular collar disposed radially about said female segment of said connector housing and said redundant latch retaining arm includes an inwardly ramped end opposite said annular collar for sequential engagement with said second redundant latch retainer arm window to define said unlocked position and then engagement with said first redundant latch retainer arm window as the second tube is received in said central bore and said annular collar of said redundant latch component is slid toward said distal end of said female segment of said quick connect housing to define said locked position.

6. A redundant locking quick connect assembly of claim 5 wherein at least part of said second redundant latch retainer arm window is axially aligned with said first redundant latch retainer arm window.

7. A redundant locking quick connect assembly of claim 5 wherein said quick connect housing includes a flange extending annularly from said quick connect housing between said male retention segment and said female segment and said flange impacting said annular collar of said redundant latch component to act as a stop as said redundant latch component is placed in said unlock position.

8. A redundant locking quick connect assembly of claim 2 wherein said female segment of said quick connect housing has a tubular shape with an exterior surface and an interior surface opposite said exterior surface.

9. A redundant locking quick connect assembly of claim 8 wherein said interior surface of said female segment defines said central bore and includes a first step portion adjacent said distal end of said female segment and a second step portion adjacent said first step portion and closer to said proximal end of said female segment and a transition portion adjacent said proximal end of said female segment where said female segment transitions to said male retention segment.

10. A redundant locking quick connect assembly of claim 9 wherein said first step portion has a predetermined diameter and said second step portion has a smaller diameter than said predetermined diameter of said first step portion.

11. A redundant locking quick connect assembly of claim 10 further including;
an inner seal disposed in said second step portion of said central bore proximate to said proximal end of said female segment of said quick connect housing to provide sealing engagement as the second tube is received in said central bore,
an inner seal spacer disposed in said second step portion of said central bore adjacent said inner seal and closer to said distal end of said female segment than said inner seal,
an outer seal disposed in said second step portion of said central bore adjacent said inner seal spacer and closer to said distal end of said female segment than said inner seal spacer to provide sealing engagement when the second tube is received in said central bore, and
an outer seal spacer disposed in said first step portion of said central bore including an annular bead protruding radially outwardly for engagement with said interior surface of said female segment of said quick connect housing.

12. A redundant locking quick connect assembly of claim 1 wherein said male retention segment of said quick connect housing has a distal end for insertion into the first tube and a proximal end opposite said distal end.

13. A redundant locking quick connect assembly of claim 12 wherein said male retention segment of said quick connect housing has a plurality of annular barbs including a pair of sealing barbs proximate to said distal end of said male retention segment and at least one retention barb disposed between to said proximal end of said male retention segment and said pair of sealing barbs.

14. A redundant locking quick connect assembly of claim 13 wherein said pair of sealing barbs are axially spaced from one another and ramped in opposite directions to present a seal channel therebetween.

15. A redundant locking quick connect assembly of claim 14 further including;
a barb seal disposed in said seal channel of said male engagement segment to provide sealing engagement as the first tube is pressed over said male engagement segment.

16. A redundant locking quick connect assembly of claim 13 wherein said at least one retention barb is ramped up to a greater radial diameter toward said proximal end of said male retention segment to facilitate insertion of said male retention segment into the first tube and to resist subsequent separation between the first tube and said male retention segment of said quick connect housing.

17. A redundant locking quick connect assembly for removably coupling a first tube and a second tube comprising;

a quick connect housing including a male retention segment for engagement with the first tube and a female segment extending axially from said male retention segment and presenting a central bore for receiving the second tube, a redundant latch component positionable between an unlocked position and a locked position with said redundant latch component having an annular collar in sliding engagement with said female segment, a twist lock retainer disposed radially outwardly of and surrounding at least a portion of said female segment and at least a portion of said redundant latch component, said female segment including a pair of twist lock retainer arm windows, said redundant latch component including a first pair of redundant latch retaining arms extending axially from said annular collar, said twist lock retainer including a pair of pockets each defining a locking channel extending axially for receiving said first pair of redundant latch retaining arms, and said twist lock retainer including a pair of twist lock retaining arms arranged perpendicularly to said pair of locking channels and extending radially inwardly of said pair of locking channels and at least partially radially inwardly of said redundant latch retaining arm to engage said pair of twist lock retainer arm windows of said female segment and to provide interleaving engagement with said first pair of redundant latch retaining arms wherein said redundant latch retaining arm is disposed radially between said twist lock retaining arm and said twist lock retainer at said pocket as said first pair of redundant latch retaining arms are received in said pair of locking channels and said redundant latch component is advanced to said locked position to prevent release of said pair of twist lock retaining arms from said pair of twist lock retaining windows;

wherein said female segment has a proximal end adjacent said male retention segment and a distal end opposite said proximal end and said pair of twist lock retaining arms include an inside face being ramped up in an axial direction to a greater radial thickness toward said proximal end of said female segment to facilitate insertion of the second tube into said central bore of said female segment and to resist subsequent separation between the second tube and said quick connect housing by locking against a bead of the second tube that extends annularly about the second tube, wherein said female segment of said quick connect housing includes a first pair of redundant latch retainer arm windows proximate to said distal end of said female segment, and wherein said female segment of said quick connect housing includes a second pair of redundant latch retainer arm windows axially spaced between said proximal end of said female segment and said first pair of redundant latch retainer arm windows.

18. A redundant locking quick connect assembly of claim 17 wherein said redundant latch component includes a second pair of redundant latch retaining arms extending axially from said annular collar with said second pair of redundant latch retaining arms being circumferentially spaced from said first pair of redundant latch retaining arms.

19. A redundant locking quick connect assembly of claim 18 wherein said first pair of redundant latch retaining arms are radially opposed from one another and said second pair of redundant latch retaining arms are radially opposed from one another.

20. A redundant locking quick connect assembly of claim 17 wherein said second pair of redundant latch retaining arms include inwardly ramped ends opposite said annular collar for sequential engagement with said second pair of redundant latch retainer arm windows to define said unlocked position and engagement with said first pair of redundant latch retainer arm windows as the second tube is received in said central bore and said annular collar of said redundant latch component is slid toward said distal end of said female segment to define said locked position.

21. A redundant locking quick connect assembly of claim 20 wherein at least part of said second redundant latch retainer arm windows are axially aligned with said first redundant latch retainer arm windows.

22. A redundant locking quick connect assembly of claim 21 wherein said pair of twist lock retainer arm windows are circumferentially spaced from said first pair of redundant retainer lock windows and said second pair of redundant retainer lock windows.

23. A redundant locking quick connect assembly of claim 22 wherein said female segment of said quick connect housing includes at least one alignment tab protruding outwardly from said female segment and said twist lock retainer includes an anti-rotation pocket receiving said at least one alignment tab and limiting over rotation of said twist lock retainer relative to said quick connect housing by restricting rotational movement of said at least one alignment tab as said twist lock retainer is being rotated to release said pair of twist lock retaining arms.

24. A locking quick connect assembly comprising;
a quick connect housing including a male retention segment for engagement with a first tube and a female segment extending axially from said male retention segment and presenting a central bore for receiving a second tube having a bead extending annularly about the second tube, said female segment having a proximal end adjacent said male retention segment and a distal end opposite said proximal end, a twist lock retainer disposed radially outwardly of and surrounding at least a portion of said female segment, said female segment including a twist lock retainer arm window extending entirely through said female segment, said twist lock retainer including at least one twist lock retaining arm having a pair of side edges extending circumferentially and radially inwardly with respect to said twist lock retainer to engage said twist lock retainer arm window of said female segment, and said at least one twist lock retaining arm including an inside face being ramped up in an axial direction to a greater radial thickness toward said proximal end of said female segment to facilitate insertion of the second tube into said central cavity of said female segment and to resist subsequent separation between the second tube and said quick connect housing by locking against the bead of the second tube;

wherein said female segment of said quick connect housing includes at least one alignment tab protruding outwardly from said female segment and said twist lock retainer includes an anti-rotation pocket receiving said at least one alignment tab and limiting over rotation of said twist lock retainer relative to said quick connect housing by restricting rotational movement of said at least one alignment tab as said twist lock retainer is being rotated to release said at least one twist lock retaining arm.

25. A locking quick connect assembly of claim 24 wherein said at least one twist lock retaining arm is a pair of twist lock retaining arms that are radially opposed from one another.

26. A locking quick connect assembly of claim 24 wherein said female segment of said quick connect housing has a tubular shape with an exterior surface and an interior surface opposite said exterior surface.

27. A locking quick connect assembly of claim 26 wherein said interior surface of said female segment defines said central bore and includes a first step portion adjacent said distal end of said female segment and a second step portion adjacent said first step portion and closer to said proximal end of said female segment and a transition portion adjacent said proximal end of said female segment where said female segment transitions to said male retention segment.

28. A locking quick connect assembly of claim 27 wherein said first step portion has a predetermined diameter and said second step portion has a smaller diameter than said predetermined diameter of said first step portion.

29. A locking quick connect assembly of claim 28 further including;
an inner seal disposed in said second step portion of said central bore proximate to said proximal end of said female segment of said quick connect housing to provide sealing engagement as the second tube is received in said central bore,
an inner seal spacer disposed in said second step portion of said central bore adjacent said inner seal and closer to said distal end of said female segment than said inner seal,
an outer seal disposed in said second step portion of said central bore adjacent said inner seal spacer and closer to said distal end of said female segment than said inner seal spacer to provide sealing engagement when the second tube is received in said central bore, and
an outer seal spacer disposed in said first step portion of said central bore including an annular bead protruding radially outwardly for engagement with said interior surface of said female segment of said quick connect housing.

30. A locking quick connect assembly of claim 24 wherein said male retention segment of said quick connect housing has a distal end for insertion into the first tube and a proximal end opposite said distal end.

31. A locking quick connect assembly of claim 30 wherein said male retention segment of said quick connect housing has a plurality of annular barbs including a pair of sealing barbs proximate to said distal end of said male retention segment and at least one retention barb disposed between said proximal end of said male retention segment and said pair of sealing barbs.

32. A locking quick connect assembly of claim 31 wherein said pair of sealing barbs are axially spaced from one another and ramped in opposite directions to present a seal channel therebetween.

33. A locking quick connect assembly of claim 32 further including;
a barb seal disposed in said seal channel of said male engagement segment to provide sealing engagement as the first tube is pressed over said male engagement segment.

34. A locking quick connect assembly of claim 31 wherein said at least one retention barb is ramped up to a greater radial diameter toward said proximal end of said male retention segment to facilitate insertion of said male retention segment into the first tube and to resist subsequent separation between the first tube and said male retention segment of said quick connect housing.

35. A locking quick connect assembly of claim 24 wherein said quick connect housing includes a flange extending annularly from said quick connect housing between said male retention segment and said female segment.

\* \* \* \* \*